United States Patent
Fujioka

(10) Patent No.: US 10,720,658 B2
(45) Date of Patent: Jul. 21, 2020

(54) FUEL CELL VEHICLE

(71) Applicant: TOYOTA JIDOSHA KABUSHIKI KAISHA, Toyota-shi, Aichi-ken (JP)

(72) Inventor: Hisaya Fujioka, Aichi-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 14 days.

(21) Appl. No.: 15/898,361

(22) Filed: Feb. 16, 2018

(65) Prior Publication Data

US 2018/0241058 A1 Aug. 23, 2018

(30) Foreign Application Priority Data

Feb. 23, 2017 (JP) ................. 2017-032323

(51) Int. Cl.
*H01M 8/04664* (2016.01)
*H01M 8/04007* (2016.01)
(Continued)

(52) U.S. Cl.
CPC ......... *H01M 8/04686* (2013.01); *B60L 58/33* (2019.02); *H01M 8/04029* (2013.01);
(Continued)

(58) Field of Classification Search
CPC ...... H01M 8/00; H01M 8/04; H01M 8/04074; H01M 8/04664; H01M 8/04671; H01M 8/04679; H01M 8/04686; H01M 8/04694; H01M 8/04701; H01M 8/04723; H01M 8/04731; H01M 2250/00; H01M 2250/20; B60L 11/00; B60L 11/18; B60L 11/1888;
(Continued)

(56) References Cited

U.S. PATENT DOCUMENTS 6,015,634 A * 1/2000 Bonville, Jr. ..... H01M 8/04097
429/415
6,171,718 B1 * 1/2001 Murach ............ H01M 8/04029
425/25
(Continued)

FOREIGN PATENT DOCUMENTS

JP 2003-168454 6/2003
JP 2006-100005 A 4/2006
(Continued)

OTHER PUBLICATIONS

U.S. Appl. No. 15/812,148, "Fuel Cell System" filed Nov. 14, 2017.

*Primary Examiner* — Keith M Raymond
*Assistant Examiner* — Gustavo A Hincapie Serna
(74) *Attorney, Agent, or Firm* — Finnegan, Henderson, Farabow, Garrett & Dunner, LLP

(57) ABSTRACT

A fuel cell vehicle according to the present disclosure includes an insulation voltage detector provided in a coolant circuit; and an ECU having a storage unit that stores an insulation voltage value detected by the insulation voltage detector. The ECU determines a coolant leak when the insulation voltage value detected by the insulation voltage detector is larger than the insulation voltage value that is obtained when an ignition was turned off a last time, the s insulation voltage values obtained when the ignition was turned off the last time being stored in the storage unit.

2 Claims, 3 Drawing Sheets

(51) Int. Cl.
*H01M 8/04537* (2016.01)
*B60L 58/33* (2019.01)
*H01M 8/04029* (2016.01)
*H01M 8/04828* (2016.01)
*H01M 8/04701* (2016.01)

(52) U.S. Cl.
CPC ... *H01M 8/04074* (2013.01); *H01M 8/04567* (2013.01); *H01M 8/04947* (2013.01); *B60L 2240/36* (2013.01); *H01M 8/04731* (2013.01); *H01M 2250/20* (2013.01); *Y02T 90/32* (2013.01); *Y02T 90/34* (2013.01)

(58) Field of Classification Search
CPC .............. B60L 11/1892; B60L 2240/00; B60L 2240/36; F25B 2500/22; F25B 2500/222
USPC .................................................. 165/11.1, 202
See application file for complete search history.

(56) References Cited

U.S. PATENT DOCUMENTS

| | | | | |
|---|---|---|---|---|
| 6,582,840 B2* | 6/2003 | Hortop | .............. | H01M 8/04029 324/439 |
| 7,311,987 B2* | 12/2007 | Enjoji | ................. | H01M 8/0258 429/434 |
| 7,666,540 B2* | 2/2010 | Nakanishi | ......... | H01M 8/04156 429/483 |
| 8,329,353 B2* | 12/2012 | Yasuda | ............. | H01M 8/04029 429/436 |
| 8,414,748 B2* | 4/2013 | Carson | ................... | A61L 2/035 204/252 |
| 8,631,866 B2* | 1/2014 | Nguyen | .................. | E21B 36/00 166/250.08 |
| 9,203,099 B2* | 12/2015 | Illner | ................ | H01M 8/04149 |
| 9,941,531 B2* | 4/2018 | Schwab | ........... | H01M 8/04029 |
| 10,084,193 B2* | 9/2018 | Han | .................. | H01M 8/04029 |
| 10,181,611 B2* | 1/2019 | Moghimi | .......... | H01M 8/04358 |
| 2003/0137193 A1* | 7/2003 | Belschner | ........... | H01M 16/006 307/9.1 |
| 2005/0084723 A1* | 4/2005 | Mori | ................. | H01M 8/04029 429/413 |
| 2008/0197832 A1* | 8/2008 | Yokoyama | ........ | H01M 8/04029 324/72 |
| 2010/0167151 A1* | 7/2010 | Nagasawa | ................ | B60K 1/04 429/437 |
| 2012/0105220 A1* | 5/2012 | Wang | .................... | B60L 3/0046 340/438 |
| 2014/0017581 A1* | 1/2014 | Drouhault | ......... | H01M 8/04029 429/413 |
| 2014/0199606 A1* | 7/2014 | Schwab | ............ | H01M 8/04029 429/437 |
| 2015/0024298 A1* | 1/2015 | Blanchet | ................... | C25B 1/02 429/432 |
| 2016/0006060 A1* | 1/2016 | Kwon | ............... | H01M 8/04395 429/442 |
| 2016/0141679 A1* | 5/2016 | Yamada | ........... | H01M 8/04029 429/437 |
| 2017/0237095 A1* | 8/2017 | Yokoyama | .......... | H01M 8/0432 429/429 |
| 2018/0115001 A1* | 4/2018 | Jennings | ................ | C01B 3/384 |

FOREIGN PATENT DOCUMENTS

| | | |
|---|---|---|
| JP | 2005-285489 | 10/2006 |
| JP | 2008-207637 A | 9/2008 |
| WO | WO2006/035287 A2 | 4/2006 |

* cited by examiner

FUEL CELL VEHICLE

INCORPORATION BY REFERENCE

The disclosure of Japanese Patent Application No. 2017-032323 filed on Feb. 23, 2017 including the specification, drawings and abstract is incorporated herein by reference in its entirety.

BACKGROUND

1. Technical Field

The present disclosure relates to a fuel cell vehicle equipped with a fuel cell cooler.

2. Description of Related Art

For example, fuel cells mounted on a fuel cell vehicle includes a fuel cell stack formed from a stack of a plurality of fuel cells. The fuel cells are each configured from an electrolyte membrane interposed between a pair of electrodes (an anode and a cathode), the electrodes being further interposed between a pair of separators. The fuel cells have adequate operating temperature ranges determined by types of electrolyte membranes. The fuel cells fail to demonstrate sufficient power generation performance when internal temperatures of the fuel cells are higher or lower than the operating temperature ranges. Accordingly, a separator of each cell is provided with a gas flow channel adapted for supplying fuel gas to the anode, and a gas flow channel adapted for supplying oxidation gas to the cathode. The separator is also provided with a coolant channel that feeds a coolant. Since the coolant cools the fuel cells, increase in temperature by reaction heat is suppressed, so that the fuel cells are regulated to be at proper operating temperature.

In order to repeatedly reuse the coolant, the fuel cells are generally connected to a circulation circuit of the coolant (coolant circuit). The coolant circuit includes a coolant supply pipe and a coolant return pipe connected through a pump. The coolant supply pipe is connected to an inlet of the coolant channel of the fuel cell, and the coolant return pipe is connected to an outlet of the coolant channel. For example, the coolant return pipe is equipped with a heat exchanger, such as a radiator, to release the heat that the coolant takes from the fuel cells to the outside through the heat exchanger.

When some abnormality occurs in such a coolant circuit in the fuel cell system including the coolant circuit, it is necessary to swiftly detect occurrence of the abnormality. This is because the abnormality in the coolant circuit may disturb sufficient supply of the coolant to the fuel cells, so that the fuel cells may be overheated, resulting in considerable deterioration in power generation performance. For example, in Japanese Patent Application Publication No. 2003-168454 (JP 2003-168454 A), abnormality in the coolant circuit is detected as follows. Specifically, there are provided a coolant inlet pressure sensor that detects supply pressure of a coolant in the vicinity of an inlet of a coolant channel of fuel cells, and a coolant outlet pressure sensor that detects discharge pressure of the coolant in the vicinity of an outlet of the coolant channel of the fuel cells. When a pressure difference between the pressure detected by the coolant inlet pressure sensor and the pressure detected by the coolant outlet pressure sensor becomes smaller than a lower limit, abnormality (occurrence of a coolant leak) is detected.

SUMMARY

However, in the method disclosed in JP 2003-168454 A, the coolant leak is undetectable until the coolant is missing (until the state where the coolant is not fed to a coolant pump adapted for circulating the coolant in the coolant circuit). Accordingly, there is a possibility that the coolant leak caused by such factors as damage of a radiator cannot be determined at an early stage.

To cope with this situation, the present disclosure provides a fuel cell vehicle equipped with a fuel cell cooler capable of determining a coolant leak at an early stage.

The fuel cell vehicle according to the present disclosure relates to a fuel cell vehicle equipped with a fuel cell cooler, the fuel cell cooler including a coolant circuit that circulates a coolant that cools fuel cells and a radiator provided in the coolant circuit. The fuel cell vehicle includes: an insulation voltage detector provided in the coolant circuit; and a control unit having a storage unit that stores insulation voltage values detected by the insulation voltage detector. The control unit is configured to determine a coolant leak when the insulation voltage value detected by the insulation voltage detector is larger than the insulation voltage value obtained when an ignition was turned off a last time, the insulation voltage value obtained when an ignition was turned off the last time being stored in the storage unit.

When the coolant leak occurs, the insulation voltage value detected by the insulation voltage detector provided in the coolant circuit goes up as compared with a corresponding value obtained during normal traveling (in the state without the coolant leak). Based on such change in the insulation voltage value, in the present disclosure, the coolant leak is determined when the insulation voltage value detected by the insulation voltage detector is larger than the insulation voltage value obtained when the ignition was turned off the last time. Since the coolant leak is determined based on change in the insulation voltage value in this way, the coolant leak can be determined at an early stage.

In the fuel cell vehicle according to the present disclosure, the coolant circuit may be provided with a coolant pump to pump the coolant in the coolant circuit. The control unit may determine a level of the coolant when determining the coolant leak, the level being determined based on change in the insulation voltage value when the rotation speed of the coolant pump is changed.

In the fuel cell vehicle according to the present disclosure, changing the rotation speed of the coolant pump may be changing the rotation speed of a water pump that is enough to circulate the coolant.

As the rotation speed of the coolant pump that pumps the coolant is changed, a circulating state of the coolant changes. Accordingly, the insulation voltage value fluctuates. Based on such fluctuation of the insulation voltage value, the level of the coolant can be determined.

The present disclosure can provide a fuel cell vehicle equipped with a fuel cell cooler capable of determining a coolant leak at an early stage.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinbelow, an embodiment of the present disclosure will be described with reference to the accompanying drawings. The description of the preferred embodiment below is merely illustrative and is not intended to limit the present disclosure, applications thereof, or the use thereof.

Figure 1:
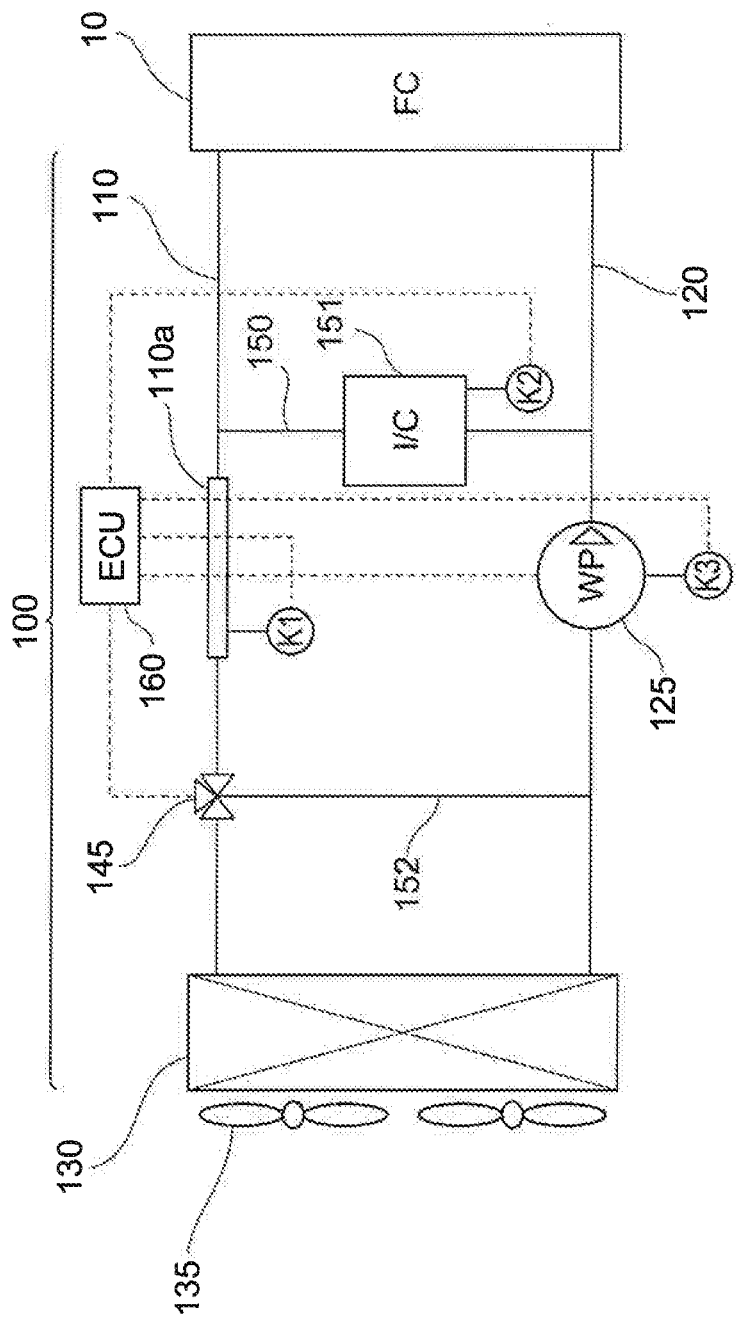
FIG. 1 is an explanatory view illustrating the configuration of a coolant circuit in a fuel cell system.

FIG. 1 is an explanatory view illustrating the configuration of a coolant circuit (fuel cell cooler) of a fuel cell system. A fuel cell stack 10 illustrated in FIG. 1 is a device that generates electric power by receiving supply of fuel gas and oxidation gas. The fuel cell stack is structured as a stack of a large number of cells. FIG. 1 illustrates only the configuration of a coolant circuit (cooling system) in the fuel cell system, with a fuel gas supply system and an oxidation gas supply system being omitted. However, the fuel cell system in the present embodiment may include configurations other than the configuration described below. The fuel cell cooler illustrated in FIG. 1 is mounted on vehicles such as a fuel cell powered vehicle (FCHV), for example. The fuel cell cooler functions as an onboard power source system of such a fuel cell vehicle.

As illustrated in FIG. 1, the fuel cell system includes a coolant circuit 100 that circulates and supplies a coolant to the fuel cell stack 10. The coolant circuit 100 is configured such that a coolant supply pipe 120 connected to a coolant inlet of the fuel cell stack 10 and a coolant discharge pipe 110 connected to a coolant outlet of the fuel cell stack 10 are connected through a water pump 125.

The coolant circuit 100 illustrated in FIG. 1 is provided with a radiator 130. The radiator 130 cools the coolant that circulates through the coolant circuit 100 by heat exchange. The radiator 130 includes a radiator fan 135. The radiator fan 135 blows air to the radiator 130 to promote heat dissipation from the radiator 130.

The coolant supply pipe 120 is a pipe for supplying the coolant to the fuel cell stack 10. The coolant supply pipe 120 is provided with a water pump 125 that pumps the coolant. The water pump 125 is driven based on a command from an ECU 160. When the water pump 125 is driven, the coolant pumped from the water pump 125 flows into a coolant passage in the fuel cell stack 10 through the coolant supply pipe 120. The coolant then flows from the fuel cell stack 10 into the coolant discharge pipe 110, and returns to the water pump 125 through the radiator 130 or a bypass pipe 152. In the present embodiment, an electric leakage detector (illustration omitted) adapted for detecting an insulation voltage value (voltage measurement value used for electric leakage determination in the vehicle) is provided at a position (measurement point K3 illustrated in FIG. 1) where the water pump 125 is provided. The electric leakage detector is connected with the ECU 160 (control unit). A signal including the insulation voltage value detected by the electric leakage detector is transmitted to the ECU 160. As described later, as the circulating state of the coolant flowing through the coolant circuit 100 changes, the insulation voltage value at the measurement point fluctuates. Accordingly, based on such fluctuation of the insulation voltage value, a coolant leak or a level of the coolant can be determined.

The coolant discharge pipe 110 is a pipe for discharging the coolant from the fuel cell stack 10. The coolant discharged from the fuel cell stack 10 flows into the radiator 130 connected to a downstream portion of the coolant discharge pipe 110. In the middle of the coolant discharge pipe 110, a three-way valve 145 is provided to switch between a flow channel of the coolant to the radiator 130 and a flow channel of the coolant to the bypass pipe 152. In the coolant circuit 100, the state where the coolant circulates between the fuel cell stack 10 and the radiator 130 is switched to the state where the coolant circulates through the bypass pipe 152 by the three-way valve 145. In the state where the coolant circulates through the bypass pipe 152, the coolant is prevented from flowing into the radiator 130. The three-way valve 145 is driven based on a command of the ECU 160 to switch circulation of the coolant (the channel that passes the coolant to the radiator 130 or the bypass pipe 152).

The coolant discharge pipe 110 is constituted of members including a metal pipeline 110a. An electric leakage detector (illustration omitted) adapted for detecting an insulation voltage value is provided at a position (measurement point K1 illustrated in FIG. 1) where the metal pipeline 110a is provided. The electric leakage detector is connected with the ECU 160. A signal including the insulation voltage value detected by the electric leakage detector is transmitted to the ECU 160. Although the metal pipeline 110a is provided in a part of the coolant discharge pipe 110 in FIG. 1, the metal pipeline 110a is not limited to the configuration of the illustrated example. The metal pipeline 110a may be provided in any given positions of the coolant supply pipe 120 and the coolant discharge pipe 110. In other words, the coolant supply pipe 120 and the coolant discharge pipe 110 may be configured to include a metal pipeline.

A portion of the coolant supply pipe 120 on the downstream side of the water pump 125 is coupled with a first end of an intercooler water supply pipe 150. A second end of the intercooler water supply pipe 150 is coupled with the coolant discharge pipe 110. The intercooler water supply pipe 150 is provided with an intercooler 151. The coolant flowing through the coolant supply pipe 120 flows into the intercooler 151 through the intercooler water supply pipe 150. The intercooler 151 is a device that cools the air pumped by a compressor (illustration omitted) provided in the oxidation gas supply system. In the present embodiment, an electric leakage detector (illustration omitted) adapted for detecting an insulation voltage value is provided at a position (measurement point K2 illustrated in FIG. 1) where the intercooler 151 is provided.

The devices adapted for detecting the insulation voltage values provided in the coolant circuit 100 correspond to the "insulation voltage detector" in this specification.

Figure 2:
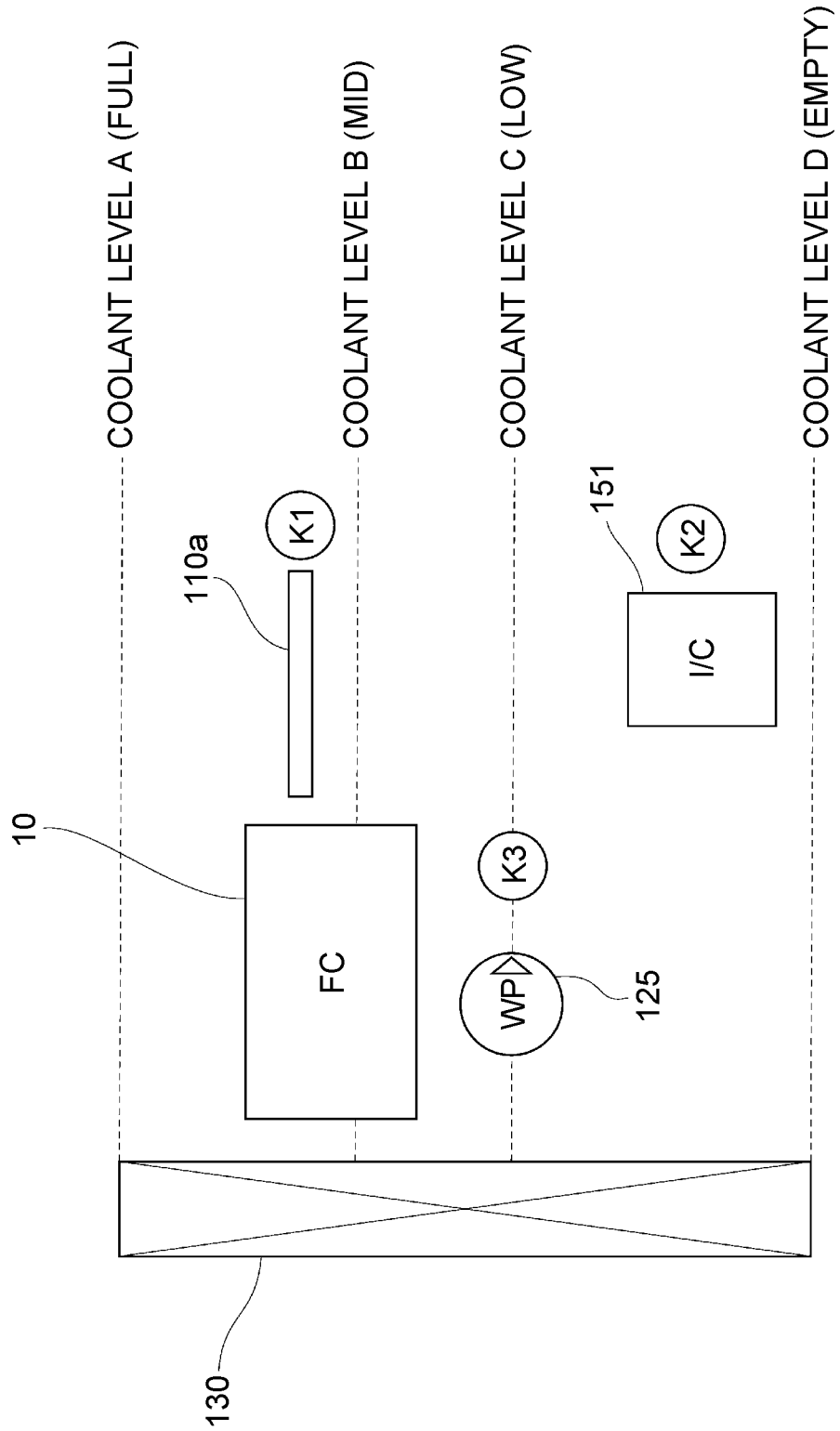
FIG. 2 is a transverse sectional view of the fuel cell system illustrated in FIG. 1.

FIG. 2 is a transverse sectional view of the coolant circuit in the fuel cell system. As illustrated in FIG. 2, the component members (such as the metal pipeline 110a, the water pump 125, and the intercooler 151) constituting the coolant circuit are provided at positions different in height from each other. In the present embodiment, the measurement points (K1 to K3) are arranged in descending order of height: the insulation voltage value measurement point K1 (where the metal pipeline 110a is provided in the coolant discharge pipe 110 (see FIG. 1)); the insulation voltage value measurement point K3 (where the water pump 125 (see FIG. 1) is provided); and the insulation voltage value measurement point K2 (where the intercooler 151 is provided). The term "coolant level" illustrated in FIG. 2 represents the level of the coolant inside the radiator 130. A coolant level A (full) represents the state where the radiator 130 is filled with the coolant. A coolant level B (mid) represents the state where the level of the coolant in the radiator 130 is middle (in the range lower than the coolant level A and higher than the coolant level C). A coolant level C (low) represents the state where the level of the coolant in the radiator 130 is low (in the range lower than the coolant level B and higher than the coolant level D). A coolant level D (empty) represents the state where the radiator 130 is out of the coolant. In the present embodiment, the measurement points (K1 to K3), and positions of the coolant levels A, B, C, D are not limited to those disclosed in the illustrated example. They can be set at any given positions as long as a coolant leak (leakage of coolant) and the level of the coolant can be determined.

During normal traveling of the fuel cell vehicle equipped with the fuel cell system illustrated in FIGS. 1 and 2, electric power is distributed due to ion elution from the fuel cells. As a result, the insulation voltage value decreases. When a coolant leak occurs, the insulation voltage value at each of the measurement points (K1, K2, K3) fluctuate in accordance with the amount of coolant leak. Accordingly, the coolant leak can be determined by detecting the fluctuation of the insulation voltage value. Specifically, when the coolant leak occurs, and the level of the coolant is short of the measurement point K1 (in the vicinity of the coolant level B illustrated in FIG. 2), no conductive substance is present (no coolant is present) at the measurement point K1. Accordingly, the insulation voltage value goes up (as compared with the insulation voltage value when the level of the coolant reaches the measurement point K1). When the amount of coolant leak further increases, and the coolant level decreases to the state where the level of the coolant is short of the measurement point K3 (less than the coolant level C illustrated in FIG. 2), no conductive substance is present (no coolant is present) at the measurement point K3. Accordingly, the insulation voltage value goes up (as compared with the insulation voltage value when the level of the coolant reaches the measurement point K3). When the amount of coolant leak further increases, and the coolant level decreases to the state where the level of the coolant is short of the measurement point K2 (in the vicinity of the coolant level D illustrated in FIG. 2), no conductive substance is present (no coolant is present) at the measurement point K2. Accordingly, the insulation voltage value goes up (as compared with the insulation voltage value when the level of the coolant reaches the measurement point K2). The details of coolant level determination processing corresponding to fluctuation of the insulation voltage value will be described later.

The electronic control unit (ECU) 160 (control unit) controls operation of various devices in the system. The ECU 160 is constituted of a computer system that is not illustrated. The computer system includes a CPU, a ROM, a RAM, an HDD, and an input-output interface, for example. As the CPU reads and executes various control programs stored in the ROM, various control actions are implemented. In the present embodiment, the ECU 160 has a storage unit that stores the insulation voltage values detected by the insulation voltage detectors, for example. For example, the ECU 160 is configured to determine a coolant leak when at least one of the insulation voltage values detected by the insulation voltage detectors is larger than one of the insulation voltage values obtained when an ignition was turned off the last time, the insulation voltage values obtained when the ignition was turned off the last time being stored in the storage unit. The details of the control actions by the ECU 160 will be described below.

Figure 3:
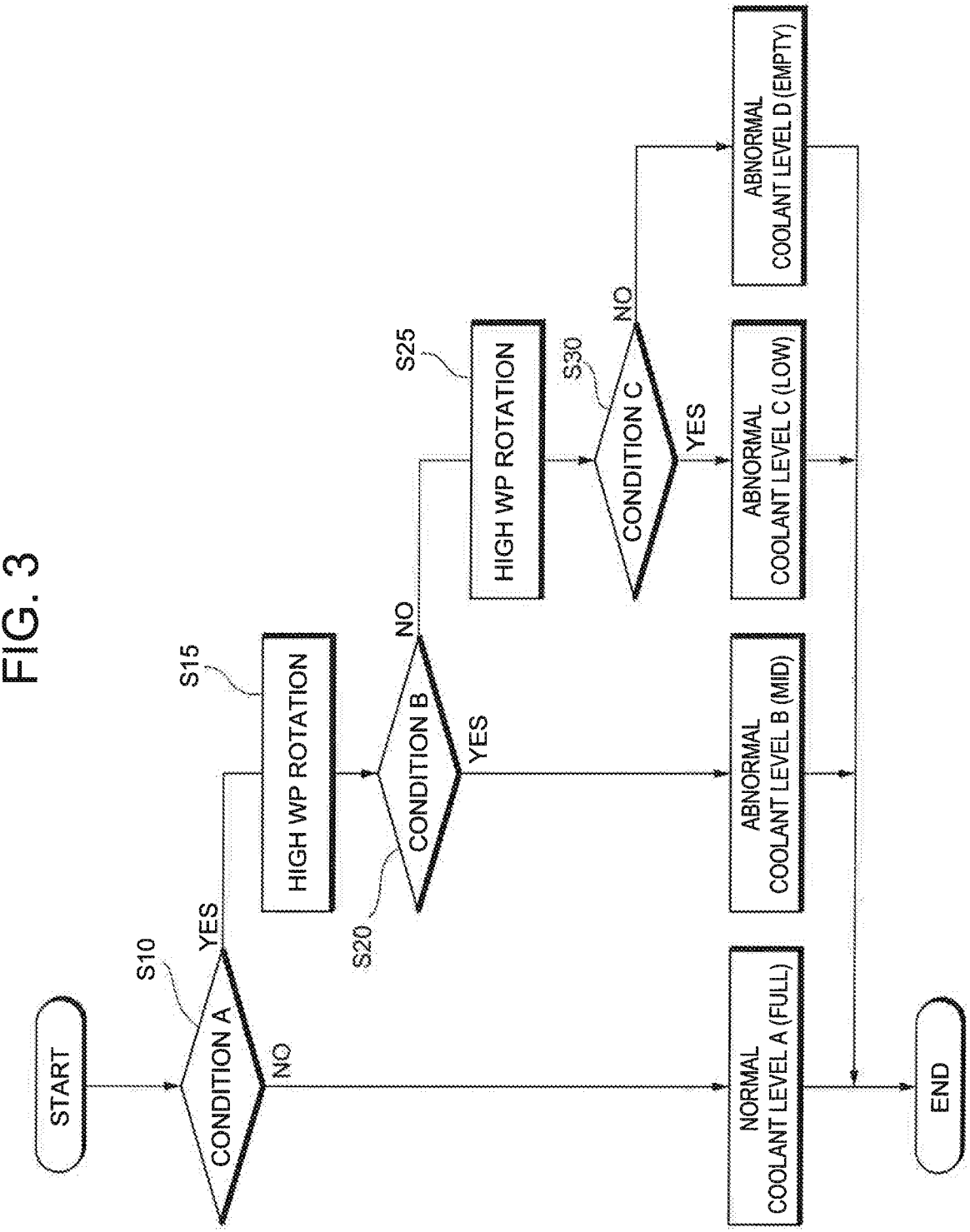
FIG. 3 is a flowchart illustrating one example of coolant level determination processing.

A description is now given of the coolant level determination processing executed by the ECU 160 illustrated in FIG. 1. FIG. 3 is a flowchart illustrating one example of the coolant level determination processing. In the following description, an insulation voltage (previous finishing value) is an insulation voltage value stored when the ignition is turned off (IGOFF) and retained till the ignition is turned on (ICON) next time. A term "low WP rotation" refers to the rotation speed of the water pump at which the coolant cannot be circulated. That is, the insulation voltage (low WP rotation) refers to an insulation voltage value detected by the electric leakage detectors during low WP rotation. A term "high WP rotation" refers to the rotation speed of the water pump at which the coolant can be circulated. That is, the insulation voltage (high WP rotation) refers to an insulation voltage value detected by the electric leakage detectors during high WP rotation.

First, in step S10, the ECU 160 determines whether or not an insulation voltage (previous finishing value) is smaller than an insulation voltage (low WP rotation) (condition A). When the insulation voltage (previous finishing value) is larger than the insulation voltage (low WP rotation) (step S10 (No)), the ECU 160 determines that the coolant is at a normal level (coolant level A (full) illustrated in FIG. 2). When the insulation voltage (previous finishing value) is smaller than the insulation voltage (low WP rotation) (step S10 (Yes)), the ECU 160 performs step S20 or step S30 described later, and determines that the coolant is at an abnormal level, i.e., determines that a coolant leak occurs in the end. Thus, the ECU 160 (FIG. 1) in the present embodiment determines that the coolant leak occurs, when at least one of the insulation voltage values detected by the insulation voltage detectors is larger than one of the insulation voltage values obtained when the ignition was turned off the last time (i.e., in the case of step S10 (Yes)), the insulation voltage values obtained when the ignition was turned off the last time being stored in a memory (storage unit). In the case of step S10 (Yes), the rotation speed of the water pump is changed before step S20, i.e., high WP rotation is executed for determination under a condition 13 described later (step S15).

In step S20 subsequent to step S10 (Yes) and step S15, the ECU 160 determines whether or not a condition B where insulation voltage (high WP rotation)<insulation voltage (low WP rotation) and threshold $B_{Low}$<insulation voltage (low WP rotation)<threshold $B_{Hi}$ is satisfied. When the condition B is satisfied (step S20 (Yes)), the ECU 160 determines that the coolant is at the coolant level B (mid). When the condition B is not satisfied (step S20 (No)), the processing proceeds to step S30. The threshold $B_{Low}$ represents a voltage value that can be measured when the coolant level is higher than K1. The threshold $B_{Hi}$ represents a voltage value that can be measured when the coolant level is higher than K3 and lower than K1. In the case of step S20 (No), the rotation speed of the water pump is changed before step S30, i.e., high WP rotation is executed for determination under a condition C described later (step S25).

In step S30 subsequent to step S20 (No) and step S25, the ECU 160 determines whether or not a condition C where insulation voltage (high WP rotation)<insulation voltage (low WP rotation) and threshold $C_{Low}$<insulation voltage (low WP rotation)<threshold $C_{Hi}$ is satisfied. When the condition C is satisfied (step S30 (Yes)), the ECU 160 determines that the coolant is at the coolant level C (low). When the condition C is not satisfied (step S30 (No)), the ECU 160 determines that the coolant is at the coolant level D (empty). The threshold $C_{Low}$ represents a voltage value that can be measured when the coolant level is higher than K3 and lower than K1. The threshold $C_{Hi}$ represents a voltage value that can be measured when the coolant level is lower than K2. The threshold $B_{Hi}$ and the threshold $C_{Low}$ may be the same value, or the threshold $B_{Hi}$ may be a voltage value smaller than the threshold $C_{Low}$.

As illustrated in FIG. 3, in the present embodiment, the level of the coolant is determined based on change in the insulation voltage values corresponding to the rotation speed of the water pump 125 (FIG. 1 or other drawings). Thus, the circulating state of the coolant fluctuates with the change in the rotation speed of the water pump 125. Accordingly, in the present embodiment, the level of the coolant can be determined based on the fluctuation of the insulation voltage values at the measurement points (K1 to K3 illustrated in FIG. 1 or other drawings) corresponding to the change in the rotation speed.

In the present embodiment described in the foregoing, the ECU 160 illustrated in FIG. 1 is integrally configured as a control unit having a storage function that stores the insulation voltage values detected by the insulation voltage detectors, a determination function that determines a coolant leak based on the insulation voltage values, and a coolant level determination function that determines the level of the coolant based on change in the insulation voltage values. However, the configuration of the ECU 160 is not limited to this example. More specifically, the control unit may be configured, for example, as different devices having the respective functions (the storage function, the coolant leak determination function, and the coolant level determination function).

The embodiment described in the foregoing is presented for easy understanding of the present disclosure and is not presented for restrictive interpretation of the disclosure. Respective elements included in the embodiment, and their arrangement, materials, conditions; forms, sizes and the like are not limited to those disclosed in the embodiment, but may properly be changed. Some component members described in different embodiments may be replaced or combined with each other.

What is claimed is:

1. A fuel cell vehicle equipped with a fuel cell cooler, the fuel cell cooler including a coolant circuit that circulates a coolant that cools fuel cells and a radiator provided in the coolant circuit, the fuel cell vehicle comprising:
   an insulation voltage detector provided in the coolant circuit; and
   an electronic control unit including a storage unit that stores an insulation voltage value detected by the insulation voltage detector, wherein
   the coolant circuit is provided with a coolant pump configured to pump the coolant in the coolant circuit, and
   the electronic control unit is configured to:
     determine a coolant leak when the insulation voltage value detected by the insulation voltage detector is larger than the insulation voltage value obtained when an ignition was turned off a last time, the insulation voltage value obtained when the ignition was turned off the last time being stored in the storage unit, and
     determine a level of the coolant when determining the coolant leak, the level being determined based on change in the insulation voltage value when rotation speed of the coolant pump is changed.

2. The fuel cell vehicle according to claim 1, wherein changing the rotation speed of the coolant pump includes setting the rotation speed of the coolant pump to a rotation speed that is enough to circulate the coolant.

\* \* \* \* \*